(12) United States Patent
Hage

(10) Patent No.: US 8,731,734 B2
(45) Date of Patent: May 20, 2014

(54) DYNAMIC GROWING SYSTEM

(75) Inventor: Mohamed Hage, Montréal (CA)

(73) Assignee: Lufa Farms, Inc., Montreal (CA)

( * ) Notice: Subject to any disclaimer, the term of this patent is extended or adjusted under 35 U.S.C. 154(b) by 221 days.

(21) Appl. No.: 12/970,193

(22) Filed: Dec. 16, 2010

(65) Prior Publication Data
US 2011/0144827 A1  Jun. 16, 2011

Related U.S. Application Data

(60) Provisional application No. 61/286,825, filed on Dec. 16, 2009.

(51) Int. Cl.
*G05D 1/02* (2006.01)
*A01G 31/02* (2006.01)

(52) U.S. Cl.
USPC .......................................... 700/302; 47/59 R

(58) Field of Classification Search
USPC ............ 700/302, 56, 60, 90; 47/39, 65, 58.1, 47/66.6, 66.7, 17, 18
See application file for complete search history.

(56) References Cited

U.S. PATENT DOCUMENTS

| | | | |
|---|---|---|---|
| 3,365,840 A | | 1/1968 | Cooper |
| 3,665,148 A | * | 5/1972 | Yasenchak et al. ........ 219/124.4 |
| 3,667,157 A | | 6/1972 | Longhini |
| 4,068,405 A | * | 1/1978 | Campbell et al. ................. 47/65 |
| 4,216,618 A | | 8/1980 | Haub et al. |
| 4,255,896 A | | 3/1981 | Carl |
| 4,337,986 A | | 7/1982 | Haub et al. |
| 4,932,158 A | | 6/1990 | Roberts |
| 5,394,647 A | | 3/1995 | Blackford, Jr. |
| 5,856,190 A | | 1/1999 | Iwai et al. |
| 7,051,476 B1 | | 5/2006 | Craul |
| 2005/0183327 A1 | * | 8/2005 | Williford et al. ................. 47/17 |
| 2009/0307973 A1 | * | 12/2009 | Adams et al. .................. 47/66.6 |
| 2010/0042234 A1 | * | 2/2010 | May et al. ....................... 700/90 |

FOREIGN PATENT DOCUMENTS

NL    1016009    * 2/2002

* cited by examiner

*Primary Examiner* — Sean Shechtman
*Assistant Examiner* — Steven Garland
(74) *Attorney, Agent, or Firm* — Norton Rose Fulbright Canada LLP

(57) ABSTRACT

A method for adjusting the vertical position of hydroponic supports of a growing system is provided. The supports are used for growing crops. A relative position between the two supports is adjustable. Actual vertical position data for the supports is received and compared with the desired data. The actual vertical position of a first support is adjusted relative to an adjacent second support when the actual data is different from the desired data. A growing system for optimizing crop production comprises generally horizontal hydroponic supports adapted to receive nutrients for feeding the crops. A position actuator is connected to the supports to vertically move them relative to one another. A position-adjusting module receives actual vertical position data of the supports and compared it with the desired data. An actuation command is transmitted to the position actuator when the actual position is different from the desired position.

14 Claims, 3 Drawing Sheets

DYNAMIC GROWING SYSTEM

CROSS-REFERENCE TO RELATED APPLICATION

The present patent application claims priority on U.S. Provisional Patent Application No. 61/286,825, filed on Dec. 16, 2009, and incorporated herein by reference.

FIELD OF THE APPLICATION

The present disclosure relates generally to a method for adjusting a vertical position of hydroponic supports of a crop growing system and a growing system for optimizing crop production in a limited growing space.

BACKGROUND OF THE ART

Hydroponic cultivation and human-assisted growing methods have become more popular in highly populated cities where cultivable soils are non-existent.

Cultivable soils surrounding large cities are also on their way to disappearing due to a phenomenon called urban sprawl. In fact, cities and their suburbs are spreading outwardly over rural lands, causing a decrease in cultivable soils, as well as a reduction in production of local products such as fresh vegetables and fruits. Such a decrease in agricultural lands is causing an increase in importation of fresh products from foreign regions or countries.

It is known that buying local food has many benefits. In fact, how the food is grown, stored, transported and processed has a large impact on climate change and environment. For example, the transport-related impacts on global warming and on pollutant emissions for the importation of fresh food are quite important. The large distance that imported food travels from where it is grown to where it is purchased or consumed, often known as food miles, results in important emissions of greenhouse gases such as carbon dioxide. Hence, increasing local production of fresh products by the use of greenhouses could have a significant positive effect on the environment.

In northern countries, such as Canada, the agricultural production of vegetables and fruits is greatly affected by seasonal changes, and is particularly minimal during winter. Hydroponic culture allows for the production of a large variety of fresh food by being independent of the season. Therefore, local production of fresh products also permits access to a large variety of high-quality products.

The implementation of hydroponic culture in large cities and suburbs could be beneficial for consumers, restaurants, etc. Although harvesting vegetables on outdoor lots due to their increasing market price is becoming popular in suburbs, population living in condominiums and apartments generally does not have access to an outdoor space where they can harvest. Thus, the implementation of hydroponic cultivation, in greenhouses for example, would give them access to freshly harvested local vegetables and to out-of-season products.

When cultivation involves the use of greenhouses that have limited space, it is important to maximize the production of crops, since such installations are capital-intensive (energy, technology, etc.)

Static methods for growing crops on multistage apparatuses to increase their growth potential are readily known. Such methods usually require manual displacement and lifting of the crops on the multistage apparatus to increase the crops' development by allowing the crops to receive more light. The disadvantages of these methods are that they usually require manual intervention, are not ergonomically efficient, and are time-consuming. It is desirable to have a method and apparatus to overcome some of the drawbacks of the prior art.

SUMMARY OF THE DISCLOSURE

In one aspect of the disclosure, there is provided a growing system and a method addressing issues associated with the prior art.

Therefore, in accordance with the present application, there is provided (a method for adjusting a vertical position of hydroponic supports of a crop growing system at a desired time, with the hydroponic supports used for hydroponically growing crops, the method comprising: providing at least two hydroponic supports respectively supporting different crops for hydroponic growing, with a relative position between the at least two hydroponic supports being adjustable; receiving actual vertical position data for the hydroponic supports; comparing the actual vertical position data for the hydroponic supports with a desired vertical position data; and adjusting the actual vertical position of at least a first one of the hydroponic supports relative to at least a second one of the hydroponic supports adjacent to the first one of the hydroponic supports when the actual position data is different from the desired vertical position data.

Further in accordance with the present application, there is provided a growing system for optimizing crop production comprising: a plurality of generally horizontal hydroponic supports comprising crops and adapted to receive nutrients for hydroponically feeding the crops; a position actuator connected to at least a portion of the hydroponic supports to vertically move the hydroponic supports relative to one another; and a position-adjusting module receiving data related to an actual vertical position of the hydroponic supports, for comparing the data related to the actual vertical position of the hydroponic supports with data related to a desired vertical position of the hydroponic supports and for transmitting an actuation command to the position actuator when the actual vertical position is different from the desired vertical position to achieve the desired vertical position for the hydroponic supports.

BRIEF DESCRIPTION OF THE DRAWINGS

Reference is now made to the accompanying drawings, which show by way of example embodiments of the present disclosure, and in which.

DESCRIPTION OF THE PREFERRED EMBODIMENTS

The present disclosure provides a method for optimizing crop production in a growing system (in a continuous manner) by using the limited available growing space of a greenhouse efficiently.

The expression "crop" is frequently used in the ensuing description and claims. Unless stated otherwise, a crop refers to the plants of a same variety planted at a same time. The growing system 10 is of the type in which different crops are cultivated simultaneously. For instance, a same variety of plant (e.g., Boston lettuce) but of different maturity (hence different crops) can be grown side by side using the growing system 10. As another example, two or more varieties of plant can be grown side by side as well. The growing system 10 may therefore optimize the space needed to space available ratios, by growing side-by-side plants of different varieties, of different maturity, etc.

The expression "vertical position" is also frequently used in the ensuing description and claims. Unless stated otherwise, a movement in the vertical position refers to a movement having at least a component in the vertical direction. Therefore, when a vertical position is modified, the modification may also include a movement along the horizontal axis (i.e., oblique movement).

Figure 1A:
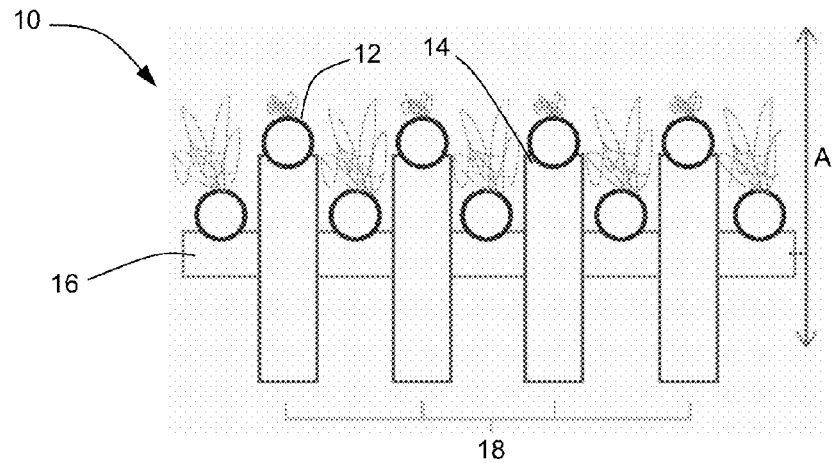
FIGS. 1A to 1C illustrate a sequence of operation of a growing system with growing crops in accordance with an exemplary embodiment.
Figure 1B:
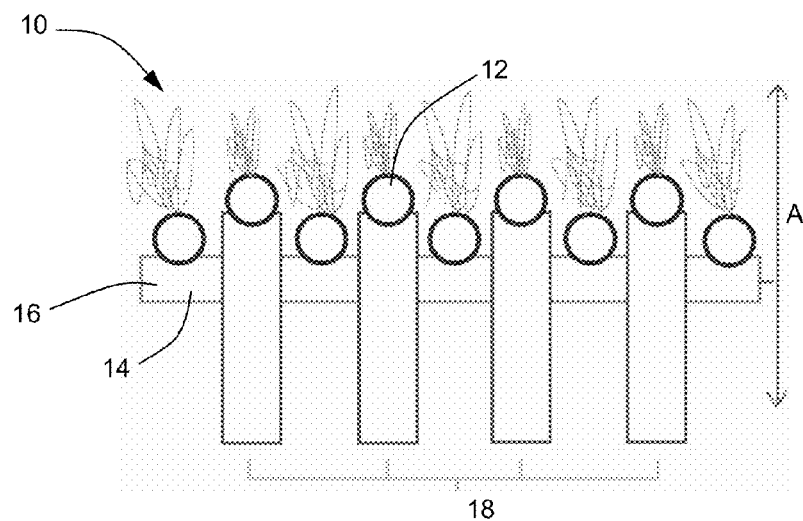
Figure 1C:
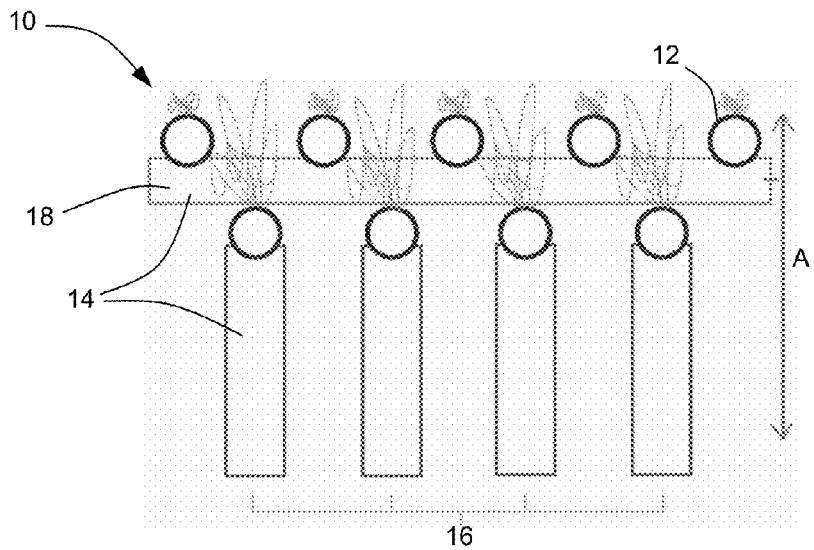

Referring to FIGS. 1A to 1C, a growing system 10 comprised of generally horizontal hydroponic supports 12 forming a hydroponic plant-growing system, for example an NFT (Nutrient Film Technique) system, is described. The hydroponic support may be any type of support adapted to receive different types of crops and nutrients for hydroponically feeding the crops. For example, a hydroponic support may be a chamber, a pipe, an elongated box, etc. To support a plurality of crops, the hydroponic support may have series of apertures along its top. In one embodiment, said apertures may be holes of different sizes for receiving crops of different kinds or sizes.

The hydroponic supports 12 can be staggered laterally permitting variation of their vertical position, and thus in the direction illustrated by A.

The hydroponic supports 12 may comprise a plurality of supports 14 that move the hydroponic supports 12 between a low position 16 and a high position 18. In the illustrated embodiment, the hydroponic supports 12 of a first set are concurrently in the low position 16, while the hydroponic supports 12 of a second set are concurrently in the high position 18. In the illustrated embodiment, the hydroponic supports 12 of the first set are intercalated with the hydroponic supports 12 of the second set in one-by-one fashion, although any other appropriate arrangement may be used. The low and high positions (16, 18) are located at a different height. The high position 18 allows for a maximum of light compared to the low position 16 because the hydroponic supports 12 and the crops at the high position 18 may shade the crops on the hydroponic supports 12 located at the low position 16. Hence, crops on the hydroponic supports located at the low position 16 would have a limited exposure to light. As shown in FIG. 1A, to minimize shading, larger or more mature crops may be positioned on the hydroponic supports 12 located at the lower position 16, while smaller or younger crops are on the hydroponic supports located at the higher position 18. During the growth of the crops, the position of the hydroponic supports 12 may be adjusted along direction A, as illustrated in FIG. 1B. When the larger crops have reached maturity, they may be replaced by younger crops and the hydroponic supports on which they were positioned may move to the high position 18 to optimize their growth, as shown in FIG. 1C.

The hydroponic supports 12 being at the low position or high position 18 are movable dependently or independently of each other by the growing system 10. The hydroponic supports 12, being at different heights, permit an increase in the amount of light that reaches the lower position 16. In an embodiment, a same set of hydroponic supports 12 supports the same crop, or supports crops having the same specifics (e.g., type, maturity, size, growing period).

By modifying the vertical position of the hydroponic supports 12, the crops may have an optimal exposure to light. The optimal position of a hydroponic support 12 (lower or higher position) is dependent on the crop's development stage. Each variety of crop may require a different time period of direct exposure to light in order to permit its growth, pollination, etc., and may require as well a time period of indirect exposure. Also, some varieties of crop may not require direct exposure to light to reach maturity. Thus, the optimal vertical position may take into account the stage of development the crops are in, as shown in FIGS. 1A to 1C, as well as the variety of crop being produced. To maximize the production of crops, different crop varieties may be used on the hydroponic supports 12. The method of the present disclosure may account for the needs of each crop to accelerate and maximize its maturation. The time period of direct exposure may also be dependent on the season if the sun is the light source.

The variation of the vertical position of the hydroponic supports may be accomplished manually, or with the use of a power-assisted system such as pneumatic, hydraulic and/or mechanical systems.

Figure 2:
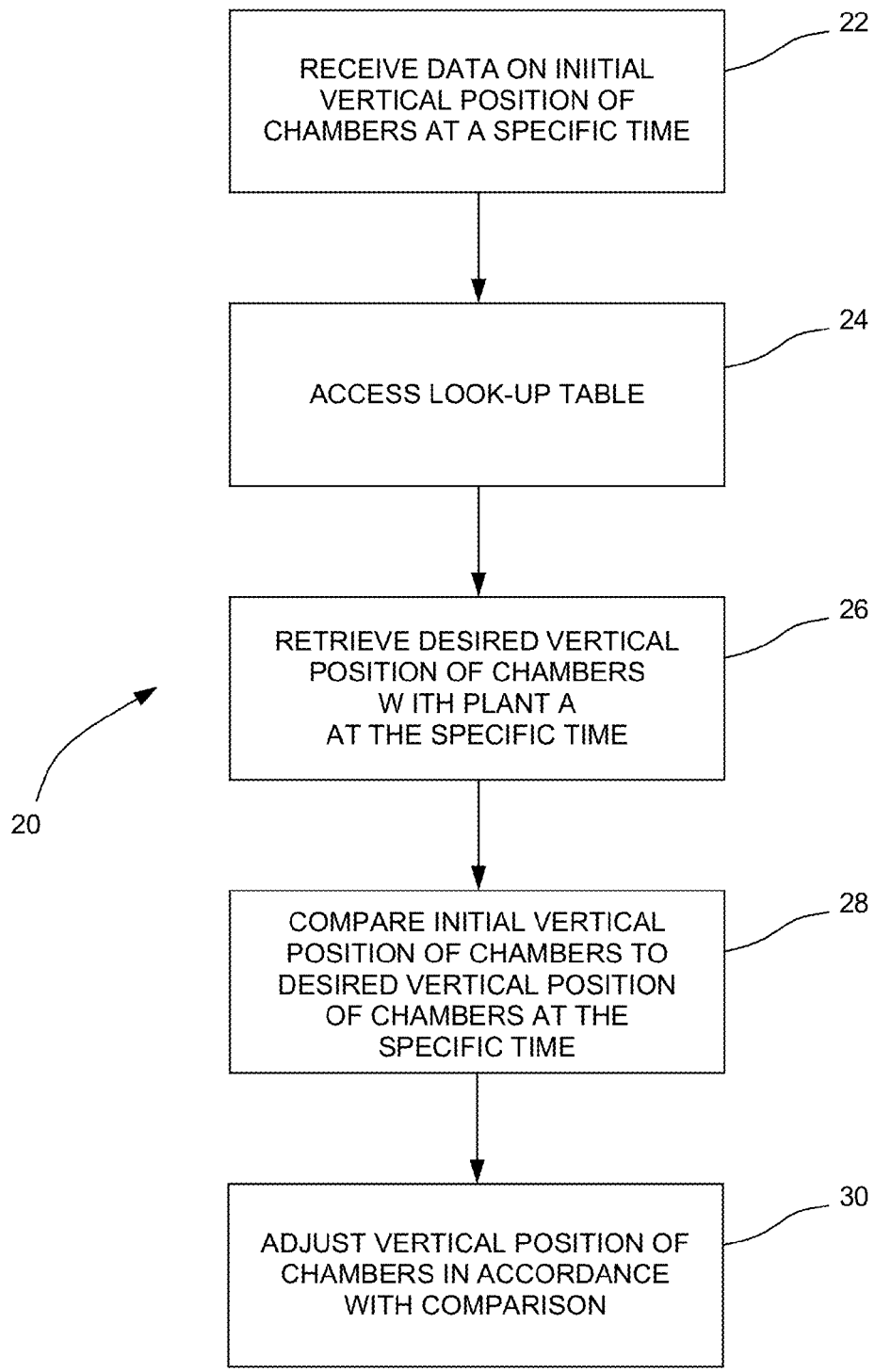
FIG. 2 is a flowchart illustrating a method for adjusting a vertical position of hydroponic supports of a growing system in accordance with an exemplary embodiment.

Reference is made to FIG. 2, which illustrates an exemplary embodiment of a method for adjusting vertical positions of the hydroponic supports of the growing system 10. The method first includes the step of providing hydroponic supports, with a relative position between the hydroponic supports being adjustable.

The method further includes the step 22 of receiving data concerning the actual position of the hydroponic supports at a specific time. The actual vertical position data can be obtained from a sensor, which can include any electrical means measuring the height of hydroponic supports or the height of the crops. The sensor can be an optical sensor, for example. The actual vertical position data can further be obtained visually, and manually entered at the specific time.

Once the data concerning the actual vertical position of the hydroponic supports is received, a look-up table may be accessed in accordance with step 24. The look-up table may be an array or matrix that contains items that are searched. For example, the look-up table may comprise data related to the crop of each hydroponic support. A desired vertical position of the hydroponic support at the specific time is then retrieved from the look-up table in accordance with step 26.

The data for the actual vertical position of the hydroponic support is compared with the retrieved desired vertical position of the hydroponic support in step 28. In view of the comparison, the vertical position of the hydroponic support may be adjusted in accordance with step 30. This adjustment permits the optimization of the crops' growth on the hydroponic support taking into account the crops located on the hydroponic support, etc. The method may individually or jointly optimize the vertical position of each hydroponic support of the growing system 10.

Although the preceding description refers to a high and a low position, different positions between the low and high positions may be accessible by the growing system 10 in accordance with an exemplary embodiment.

Figure 3:
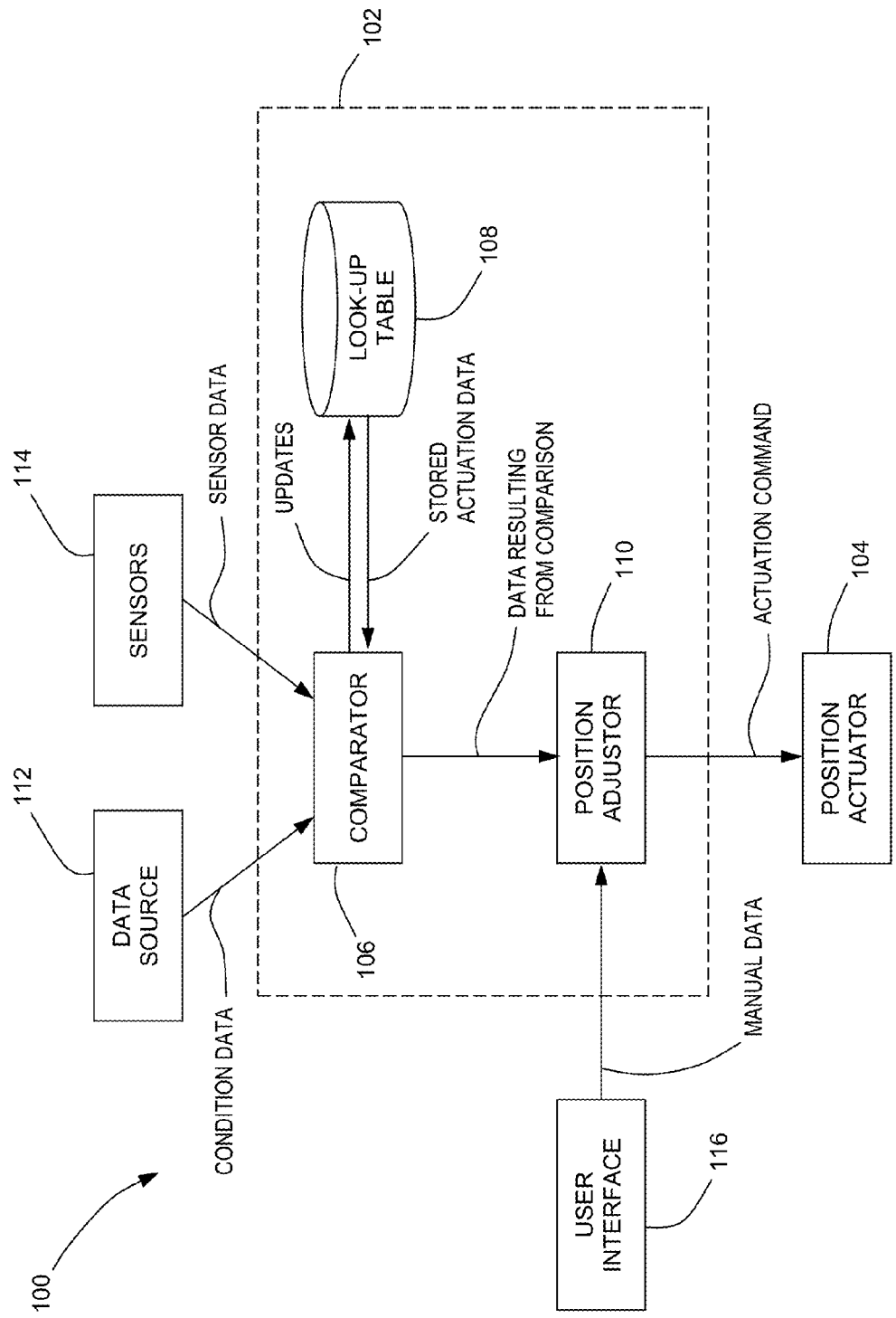
FIG. 3 is a block diagram illustrating an apparatus for adjusting a vertical position of hydroponic supports of a growing system in accordance with another exemplary embodiment.

Reference is made to FIG. 3, which illustrates an exemplary embodiment of a growing system 100 for adjusting the vertical position of hydroponic support(s) 12 of the growing system 10 at a specific time. The system 100 may comprise a position-determining module 102 and a position actuator 104. The position-determining module 102 receives data (112, 114, 116) related to the variation of the vertical position of the hydroponic support. The position-determining module 102 then determines if the vertical position should be adjusted and sends an actuation command to the position actuator 104. The position-determining module 102 may be a processing unit, a server, computer, etc.

Examples of data related to the adjustment of the vertical position of the hydroponic supports may be a data source 112. The data source 112 may originate from an external module or from the same module 102. The data source 112 contains condition data related to the crops' environment, such as temperature, humidity, amount of light exposure, etc. The data source 112 may be a commercial device or software such as Priva™. Other examples of data related to the adjustment of the vertical position of hydroponic supports may be data obtained from sensors 114 or manual data obtained from a user interface 116. The sensors may be optical sensors, weight sensors, light sensors, thermometers, humidity sensors, etc. The user interface 116 may be a mouse, a keyboard, a monitor an up/down external switch, etc. The position-determining module 102 receives data from any of the above-mentioned sources, and also receives data from an external look-up database. The position-determining module 102 may send an actuation command to the position actuator 104, for instance, if a manual command is entered via the up/down switch.

In one embodiment, the position-determining module 102 may comprise a comparator 106, a look-up database 108 and a position adjustor 110. The look-up database 108 may also be external from the position-determining module 102. The comparator 106 receives condition data from the data source 112 and/or sensor data from the sensors 114. The comparator further receives stored actuation data from the look-up database 108 to compare said stored actuation data with condition data and/or sensor data. The data resulting from the comparison is then sent to the position adjustor 110, which transmits an actuation command to the position actuator 104, in accordance with comparison data. The user interface 116 may also send manual data to the position adjustor 110, which transmits the actuation command to the position actuator 104. The look-up database 110 may also receive updates from the comparator 106. In another embodiment, the look-up database 110 may receive updates from the user interface 116 (not shown).

The position-determining module 102 may also comprise a data-receiving and data-directing module. The data-receiving and -directing module may receive the data related to the actuation of the vertical position of a hydroponic support (112, 114) and/or data from the user interface, and direct the data to the comparator 106 when necessary.

The embodiments of the present disclosure described above are intended to be examples only. Those of skill in the art may effect alterations, modifications and variations to the particular exemplary embodiments without departing from the intended scope of the present disclosure. In particular, selected features from one or more of the above-described exemplary embodiments may be combined to create alternative exemplary embodiments not explicitly described, features suitable for such combinations being readily apparent to persons skilled in the art. The subject matter described herein in the recited claims intends to cover and embrace all suitable changes in technology.

The invention claimed is:

1. A method for adjusting a vertical position of hydroponic supports of a crop growing system at a desired time, with the hydroponic supports used for hydroponically growing crops, the method comprising:

providing a plurality of floor-mounted hydroponic supports respectively supporting different crops for hydroponic growing, the hydroponic supports being side by side with a first set of the hydroponic supports at a first height, and at least a second set of the hydroponic supports at a second height different from the first height, with the hydroponic supports of the first height and the second height being staggered, and with a relative height between the at least two sets of hydroponic supports being adjustable;

receiving actual vertical position data for the hydroponic supports;

comparing the actual vertical position data for the hydroponic supports with a desired vertical position data; and adjusting the actual vertical position of the first set of the hydroponic supports relative to at least the second set of the hydroponic supports to raise the hydroponic supports of the second set relative to the hydroponic supports of the first set in response to the actual position data being different from the desired vertical position data.

2. The method according to claim 1, further comprising retrieving the desired vertical position data for the hydroponic supports from a look-up table comprising data related to the crop of a hydroponic support.

3. The method according to claim 1, wherein said receiving actual vertical position data comprises receiving sensor data for the hydroponic supports.

4. The method according to claim 3, wherein receiving sensor data comprises receiving sensor data relative to a height of one said crops.

5. The method according to claim 1, wherein said providing comprises providing the first set of the hydroponic supports with a same first crop, and providing the second set of the hydroponic supports with a same second crop.

6. The method according to claim 1, wherein adjusting the actual vertical position for the hydroponic supports comprises varying the actual vertical position when at least one of the sets of hydroponic supports comprises a crop that requires an increased exposure to light.

7. The method according to claim 1, wherein adjusting the actual vertical position for the hydroponic supports comprises varying the actual vertical position when at least one of the sets of hydroponic supports comprises a crop that requires a reduced exposure to light.

8. A growing system for optimizing crop production comprising:

a plurality of generally horizontal floor-mounted hydroponic supports comprising crops and adapted to receive nutrients for hydroponically feeding the crops, the hydroponic supports being side by side with a first set of the hydroponic supports at a first height, and at least a second set of the hydroponic supports at a second height different from the first height, with the hydroponic supports of the first height and the second height being staggered;

at least one position actuator connected to at least a portion of the hydroponic supports to vertically move the sets of hydroponic supports vertically relative to one another; and a position-adjusting module receiving data related to an actual vertical position of the hydroponic supports, for comparing the data related to the actual vertical position of the hydroponic supports with data related to a desired vertical position of the hydroponic supports and for transmitting an actuation command to the at least one position actuator responsive to the actual vertical position being different from the desired vertical position to achieve the desired vertical position for the sets of hydroponic supports.

9. The system of claim 8, further comprising sensors for providing the position-adjusting module with said actual data.

10. The system of claim 9, wherein the sensors are at least one of optical sensors, weight sensors, light sensors, thermometers, and humidity sensors.

11. The system of claim 8, further comprising an interface for the data to be entered manually.

12. The system of claim 8, wherein the hydroponic supports of the first set comprise a first crop, and the hydroponic supports of the second set comprise a second crop.

13. The system of claim 8, wherein the at least one position actuator solely moves the hydroponic supports of the first set while the hydroponic supports of the second set are immovable.

14. The system of claim 8, wherein the hydroponic supports of the first set and of the second set are intercalated unit per unit.

* * * * *